(12) United States Patent
Halacz

(10) Patent No.: US 6,920,215 B2
(45) Date of Patent: Jul. 19, 2005

(54) COMMUNICATIONS SYSTEM AND METHOD FOR MONITORING A GROUP CALL NUMBER OF THE COMMUNICATIONS SYSTEM

(75) Inventor: Peter Halacz, Duisburg (DE)

(73) Assignee: Siemens Aktiengesellschaft, Munich (DE)

( * ) Notice: Subject to any disclaimer, the term of this patent is extended or adjusted under 35 U.S.C. 154(b) by 274 days.

(21) Appl. No.: 10/131,878

(22) Filed: Apr. 24, 2002

(65) Prior Publication Data

US 2002/0159581 A1 Oct. 31, 2002

(30) Foreign Application Priority Data

Apr. 24, 2001 (DE) .......................................... 101 20 072

(51) Int. Cl.[7] .......................... H04M 3/00; H04M 7/00; H04M 3/42
(52) U.S. Cl. ............................. 379/265.02; 379/202.01; 379/219; 379/220.01
(58) Field of Search ........................... 379/220.01, 219, 379/202.01, 265.02, 265.03

(56) References Cited

U.S. PATENT DOCUMENTS

| | | | |
|---|---|---|---|
| 4,953,204 A | | 8/1990 | Cuschleg, Jr. .......... 379/266.05 |
| 6,094,479 A | * | 7/2000 | Lindeberg et al. ...... 379/220.01 |
| 6,424,709 B1 | * | 7/2002 | Doyle et al. ........... 379/265.02 |
| 6,647,109 B1 | * | 11/2003 | Henderson .................. 379/219 |
| 6,707,899 B2 | * | 3/2004 | Saito et al. ............ 379/202.01 |
| 6,748,072 B1 | * | 6/2004 | McGraw et al. ....... 379/265.03 |

FOREIGN PATENT DOCUMENTS

| | | |
|---|---|---|
| DE | 197 52 403 A1 | 5/1999 |
| DE | 198 57 901 | 6/2000 |
| DE | 100 25 437 | 5/2001 |
| DE | 199 55 760 | 5/2001 |
| DE | 100 25 438 | 6/2001 |
| DE | 100 10 462 A1 | 9/2001 |

OTHER PUBLICATIONS

XP–002251761—"IP Telephony with TAPI 3.0" —Microsoft Corporation updated Apr. 1999.

XP–002266927—"Services for Computer Supported Telecommunications Applications (CSTA) Phase II", ECMA Standardizing Information and Communication Systems Dec. 1994, pp. 1–60.

* cited by examiner

Primary Examiner—Harry S. Hong
Assistant Examiner—Thjuan P Knowlin
(74) Attorney, Agent, or Firm—Bell Boyd & Lloyd LLC

(57) ABSTRACT

Computer-controlled communications system, particularly a private branch exchange for telephone and data communication, including a computer with at least one CTI application, a number of terminals which are combined to form a group, and an interface for transmitting data between the computer and one of the terminals. The interface monitors group call numbers and transmits status changes of the group call numbers with respect to at least one feature and/or to changes of the terminal status/statuses.

7 Claims, 1 Drawing Sheet

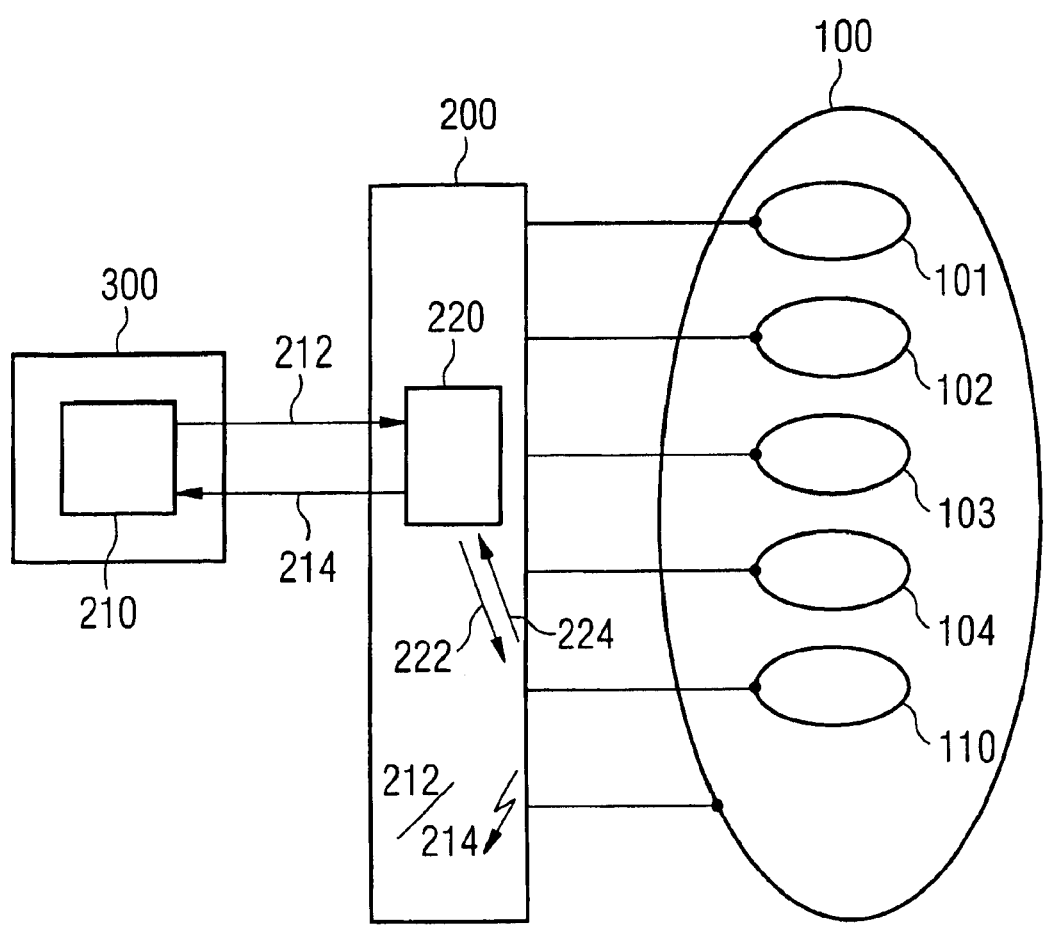

COMMUNICATIONS SYSTEM AND METHOD FOR MONITORING A GROUP CALL NUMBER OF THE COMMUNICATIONS SYSTEM

BACKGROUND OF THE INVENTION

The present invention relates to a communications system for telephone and data communication, as well as to a method for monitoring a group call number of such a communications system.

Communications systems such as, for example, program-controlled private branch exchanges (PBXs) for local (analog and digital) telephone and data communication have components which enable analog and digital terminals to be connected to the communications system. Due to the computer structure normally used today in such a communications system, the terminals can be provided with a large number of features by the communications system.

In contrast to a service attribute, a feature is a function of a terminal. The feature possibly may be independent of services and offer functions which are additional to the normal base functions of the terminal; for example, for the purpose of easier, faster or simpler operation.

In particular, such features relate to service attributes in the field of telephone traffic with analog and digital (ISDN) exchange connections. Thus, for example, numerous variants of the delivery and forwarding of incoming calls to the terminals connected to the communications system, such as line groups or group call numbers, night service connections, call forwarding, call duplications, operator positions, etc., can be implemented as features.

For example, a subscriber at a terminal can use a function "call log" as a feature. In this feature, the call number of a caller is stored if he/she encounters a busy signal or if the called party has not accepted the call because he/she was absent or occupied. The telephone numbers of all calls which were not accepted can be indicated on the terminal and the subscriber can choose whether one of these numbers is to be used for a callback (without typing in the complete call number). For example, the number currently indicated or marked in the log is automatically dialed when the receiver is taken off-hook.

Furthermore, various directory functions and/or notebook functions can be used as features by a subscriber at a terminal. Thus, for example, it is possible that a telephone number mentioned during a conversation is typed into the terminal and temporarily stored. Once the current conversation has ended, this call number can be selected and dialed by a simple key stroke.

It is typical of such features that, to implement them in the communications system, a special software is processed which generally uses the parameters allocated for this purpose (control information data/feature data) which are stored unambiguously addressably for the respective feature in a memory of the communications system. These data are also administered by software which is set up for this purpose.

Configuring, using and/or monitoring the features requires displaying the associated parameters, changing them and/or activating or deactivating the corresponding function of the feature. The access to a memory required for this purpose, in which the associated control information data/feature data are stored, is performed, on the one hand, via the terminals of the switching system. A proprietary transmission protocol is used for such an access to the memory.

In addition to a terminal, a computer can be allocated via the communications system to a subscriber at his/her workstation. In the literature, an interface between the communications system and application programs running on the computer is called CTI (Computer Telephone Integration). CTI is basically related to the control of all telephony functions at a workstation via the computer arranged there.

A number of standards have been developed for transmitting information via a CTI interface; for example, the TAPI (Telephony Applications Programming Interface) standard. Via current CTI application interfaces, for example CSTA ECMA Phase III/TAPI 3.0, it is possible to monitor the state and/or a transmission of state changes for a particular terminal. However, the control functions are restricted inasmuch as only a single terminal can be monitored.

In medium-sized and large companies, work is usually organized in groups, departments or areas which are, in each case, responsible for certain tasks and processes. In many cases, it is also desirable to carry out the telephone traffic of such smaller units of a company or of a facility with particular common features and, if necessary, to determine and monitor such commonalties in the operation of a communications system.

From U.S. Pat. No. 4,953,204, a method and a system for call processing of incoming calls for a service provider is known, in which the service provider has a number of ACD (Automatic Call Distribution) units. If no lines to the ACD units are available, an incoming call is inserted into one or more available queues. One or more of these queues allow the call to be forwarded to an arbitrary ACD unit as soon as an agent of an ACD unit becomes available.

From German laid open specification DE 100 10 462 A1, a method for a status request of a communication device belonging to a subscriber group is known. In this document, a status inquiry, initiated from an operators station which is connected to a first exchange, for setting up a connection via a second exchange to the communication device belonging to the subscriber group, is directed from the first exchange to the second exchange via an existing signaling path.

From German laid open specifications DE 100 25 437 A1, DE 100 25 438 A1 and DE 199 55 760 A1, a method and a communication arrangement for implementing subscriber features is known in each case, with at least a part of the subscriber lines allocated to at least two switching systems and having configured features being allocated to a group. The group is controlled from one of the switching systems, with subscriber lines not allocated physically to this switching system being allocated to this as virtual subscriber lines.

In existing communications systems and CTI applications, such groups only can be determined and monitored by individually interrogating the terminals of all members of the structural unit in a cumbersome and time-consuming manner.

The present invention is, therefore, directed toward a communications system with extended functionality which enables common features of terminals of subscribers collaborating in structural units to be monitored and adjusted in a simplified and faster manner.

SUMMARY OF THE INVENTION

A key point of the present invention lies in the fact that a CTI application interface, in connection with a communications system, has an interface which is constructed in such a manner that it can monitor a group call number and transmit status changes of the group call number to the CTI application. Thus, all functions and capabilities for monitoring a terminal are also available to the CTI application for monitoring a group call number.

In a preferred embodiment, a virtual subscriber, or one that is purely set up in software, is allocated to the group call number to be monitored. The virtual subscriber is a subscriber without the support of hardware; i.e., without a terminal which is physically present. Although he/she is not present physically, the virtual subscriber can be allocated all the features available for a physically present terminal within a communications system.

The entity of the virtual subscriber provides a CTI application with a software-based access to the status information of the virtual subscriber and thus to the status information of the group call number to be monitored. By setting up such a virtual subscriber which is part of the group, it becomes possible, together with a CTI protocol standard (CSTA ECMA Phase III), to transmit the status and, respectively, the status changes of a group call number to be monitored.

Additional features and advantages of the present invention are described in, and will be apparent from, the following Detailed Description of the Invention and the Figures.

BRIEF DESCRIPTION OF THE FIGURES

FIG. 1 shows a diagrammatical representation of a communications system to which the present invention is directed.

DETAILED DESCRIPTION OF THE INVENTION

FIG. 1 shows diagrammatically a group of terminals 100 which includes a number of terminals 101 to 104. Furthermore, a virtual subscriber 110 is allocated to the group of terminals 100. The group of terminals 100 is connected to a communications system 200 and is controlled and administered in the same manner as the terminals 101 to 104 and 110. The virtual subscriber 110 is implemented as software in the communications system 200.

Furthermore, a computer 300 (for example, a personal computer, PC in short) on which a CTI application 210 is running, is connected to the communications system 200. The CTI application 210 has access to the group of terminals 100 via an interface 220 of communications system 200. In the present exemplary embodiment, the CTI application 210 has access to the virtual subscriber 110 of the group of terminals 100 via the interface 220, which is implemented, for example, as CSTA ECMA Phase III/TAPI 3.0 interface. The virtual subscriber has the same settings for features as the physically present terminals or subscribers 101 to 104.

To monitor the status of the group of terminals 100, the CTI application 210 sends a corresponding inquiry to the interface 220 of the communications system 200 via the standard CTI protocol 212. The former monitors the virtual subscriber 110 of the group of terminals 100 via a proprietary transmission protocol 222. Since the status of the virtual subscriber 110 reflects the status of the group of terminals 100, the status transmitted by the virtual subscriber 110 to the interface 220 via the proprietary transmission protocol 224 can be equated with the status of the entire group of terminals 100. The interface 220 transmits the received status information via the standard CTI protocol 214 to the CTI application 210 which had originally requested the desired information for monitoring.

In the text which follows, some sample applications of the communications system according to the present invention will be briefly presented:

1. The members of the group of terminals 100 in a company cannot be reached temporarily; for example, because of a group meeting in which they do not wish to be disturbed. A call diversion is set so that all incoming calls to the group call number are diverted to a terminal, not allocated to the group of terminals 100, within the communications system 200; for example, a switchboard. Since this call diversion is also set for the virtual subscriber 110, the status change which affects the entire group of terminals 100 only can be monitored by monitoring the virtual subscriber 110. After an interrogation of the virtual subscriber 110, the "call diversion to the other subscriber" information stored there is forwarded via the interface 220 to the interrogating CTI application 210. The information is, thus, available to the CTI application 210 as data information for further processing; for example, for informing other groups of terminals or management.

2. The members of the group of terminals 100 in a company again cannot be reached temporarily; for example, because not all workstations are occupied. The CTI application 210 has the task, for example, of switching a call to the group of terminals 100 which does not accept it for longer than 30 seconds, to another terminal, not allocated to the group of terminals 100, within the communications system 200; for example, a telephone booth in accordance with an agent principle. The CTI-controlled switching function responds to changes of the terminal status/statuses (e.g., ringing) in order to activate the switching function described. This information is forwarded via the interface 220 to the monitoring CTI application 210 by monitoring the virtual subscriber 110. Thus, the CTI application 210 is provided with information on terminal status changes for any further processing.

Although the present invention has been described with reference to specific embodiments, those of skill in the art will recognize that changes may be made thereto without departing from the spirit and scope of the present invention as set forth in the hereafter appended claims.

What is claimed is:

1. Communication system for telephone and data communication comprising:

at least one CTI application running on a data processing device;

a plurality of terminal devices coupled to a terminal device group;

a CTI interface for transmitting data between the data processing device and at least one of the terminal devices; and means for monitoring group call numbers within the CTI interface and for transmitting status changes of the group call numbers with respect to at least one performance feature, whereby the means respectively includes a virtual subscriber assuming the same statuses as the terminal devices of the terminal device group.

2. A communications system according to claim 1, wherein the means for monitoring group call numbers within the CTI interface further comprises transmitting status changes of the group call numbersr with respect to changes of the terminal device status/statuses.

3. A communication system according to claim 1, wherein the virtual subscriber is allocated to the terminal device group.

4. A method for monitoring and for transmitting status changes of terminal devices of a communication system, said method comprising:

executing a CTI application on a data processing device;

assigning a plurality of terminal devices to a terminal device group;

transmitting data between the data processing device and at least one of the terminal devices via a CTI interface; and monitoring group call numbers within the CTI interface, wherein the step of monitoring includes a virtual subscriber that assumes the same statuses as the terminal devices of the terminal device group; and transmitting status changes of the group call numbers with respect to at least one performance feature and/or with respect to changes of the terminal device status/statuses.

5. The method according to claim 4, further comprising transmitting status changes of the group call numbers with respect to changes of the terminal device status/statuses.

6. The method according to claim 4, wherein the terminal devices that are combined to a terminal device group are monitored with respect to at least one performance feature as a terminal device group, and in that the status changes of the terminal device group are transmitted externally by a status change of the virtual subscriber allocated to the terminal device group.

7. The method according to claim 6, wherein the step of monitoring the terminal device group further comprises:

establishing a connection between the CTI application via the CTI interface with respect to the virtual subscriber allocated to the terminal device group;

inquiring stored bits of status information via the status of the virtual subscriber by means of a standard CTI protocol by the CTI application;

accessing the status information of the virtual subscriber by the CTI application via the interface that detects the information by a proprietary transmission protocol; and transmitting the information externally by a standard CTI protocol.

* * * * *